United States Patent Office 2,816,525
Patented Dec. 17, 1957

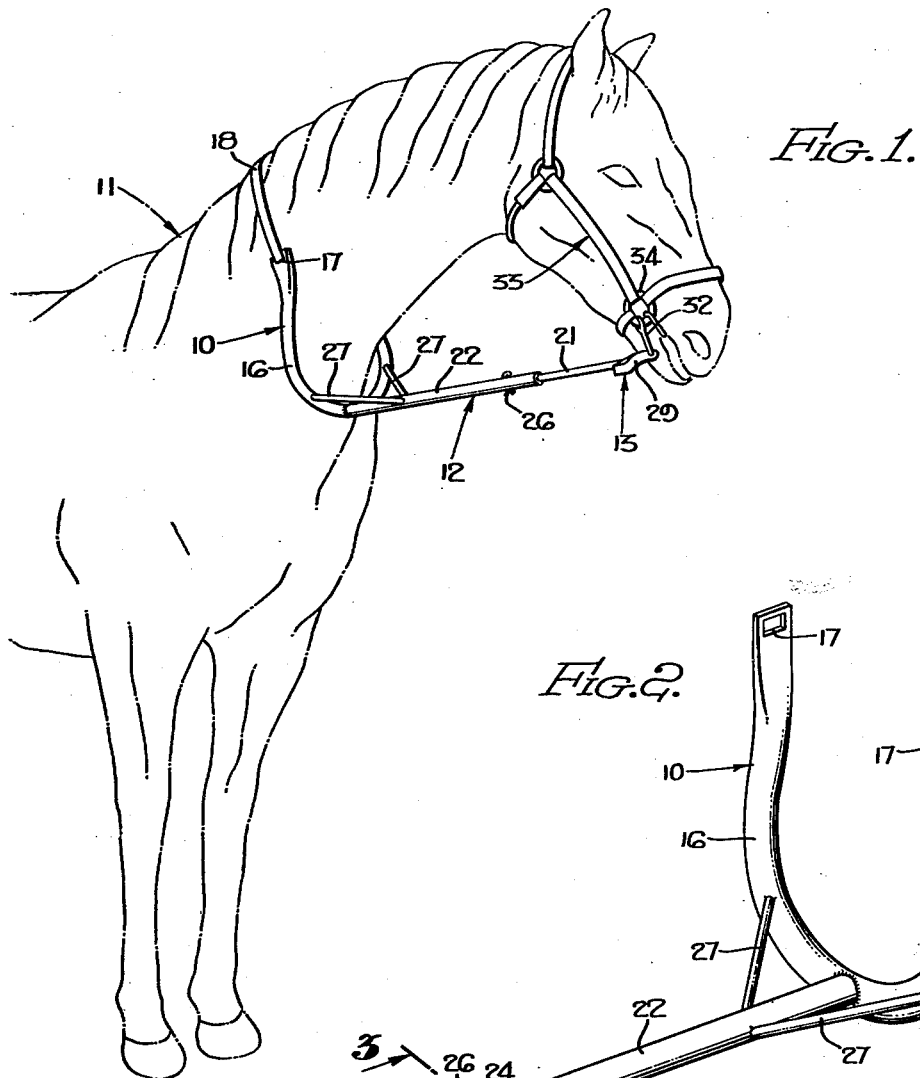

2,816,525

RESTRAINING CRADLE FOR HORSES

Kenneth A. Hoagland, Chatsworth, Calif.

Application June 30, 1955, Serial No. 519,170

4 Claims. (Cl. 119—137)

This invention relates to equipment for horses, and more particularly to a restraining cradle adapted to prevent a race horse from worrying or biting sores on his front legs.

It is a well recognized fact that race horses are extremely valuable, high-strung animals which are very easy to injure or lame. In particular, the front legs of these animals frequently become sore or locally diseased due either to natural causes, or to minor operations performed thereon by trainers or veterinarians. The healing of such sores would normally occur in a reasonably short period of time were it not for the fact that the horse frequently cranes his neck downwardly and worries the sores with his lips and teeth. Such worrying of the sores necessarily retards their healing and may cause the spread of infection, with consequent crippling of the horse for an excessively long period of time.

Because of the highly nervous and delicate character of a race horse, any appliance which is secured to the belly of the horse, or to the sides of the body thereof, is completely unsatisfactory in that the horse is bothered excessively by it, and his natural nervousness is increased unduly. Furthermore, any rigid appliance which is secured to the belly or sides of the horse tends to rub excessively due to the movement of the head of the animal, and may create sores at the rubbing point.

In view of the above factors characteristic of horses and appliances therefor, it is an object of the present invention to provide a restraining cradle adapted to prevent a horse from biting sores on its front legs, and which operates without discomfort to the horse and without possibility of injury thereto.

An additional object is to provide a restraining appliance which operates between the nose or jaw and the lower neck of a horse, as distinguished from appliances which operate between the nose or jaw and the main body of the horse.

These and other objects and advantages of the invention will be more fully set forth in the following specification and claims considered in connection with the attached drawing to which they relate.

In the drawing:

Figure 1 is a perspective view illustrating the appliance of the invention as applied to the head and neck of a race horse;

Figure 2 is an enlarged perspective view illustrating the rigid portions of the appliance, as removed from the horse; and Figure 3 is an enlarged transverse sectional view taken along line 3—3 of Figure 2.

Referring now to the drawing, and particularly to Figures 1 and 2 thereof, the restraining cradle may be seen to comprise a collar element 10 adapted to be associated with the lower neck of a race horse which is indicated at 11 in Figure 1. The cradle further comprises a rigid connector 12 secured to the lower portion of collar element 10 and extending forwardly therefrom, and a bifurcated attaching means 13 provided at the forward end of connector 12 for securing to the horse adjacent its nose and jaw.

The collar element 10 comprises a rigid, U-shaped underportion 16 formed of tubular steel or aluminum, or aluminum bar stock, and having eyes 17 at its ends for reception of the ends of a strap 18 which forms the remaining portion of the collar. As illustrated in Figure 1, underportion 16 fits against the underside of the lower neck of horse 11, and is flattened at its end portions so as to prevent discomfort to the horse at the connections between portion 16 and strap 18. The strap 18 fits over the mane of the horse and serves to maintain underportion 16 in the desired location.

Connector 12 preferably comprises inner and outer telescoping tubes 21 and 22, formed of tubular steel or aluminum, and which connect, respectively, to attaching means 13 and to the center or base of collar portion 16. Preferably, such connections between tubes 21 and 22 and their associated elements are made by means of arc welding.

In order to permit adjustment of the length of the connector 12, the inner tube 21 is formed with a plurality of longitudinally spaced holes 23, and outer tube 22 is formed with a single hole 24 adapted to register with various ones of the holes 23 depending upon the degree of telescoping of the inner tube into the outer tube. A cotter pin 26 is inserted into the registered holes 23 and 24, as best shown in Figure 3, in order to lock the connector 12 in any desired adjusted position. The appliance may thus be adapted to various horses and various conditions.

It is emphasized that the connector 12 is generally perpendicular to the plane of collar portion 16. As a result of this desirable construction, a considerable strain is exerted on the connection or weld between outer tube 22 and collar 16 when the horse attempts to crane his neck downwardly to bite his front legs. To prevent bending of the connector 12 relative to the collar due to the effects of such strain, a pair of rigid side braces 27 are welded between outer tube 22 and collar portion 16 at points spaced from the direct welded connection therebetween. These braces preferably take the form of steel or aluminum rods.

The bifurcated attaching means 13 is preferably formed as a strip of steel or aluminum, having a base 28 and two parallel arms 29. Base 28 extends perpendicular to inner tube 21 and is centrally welded thereto as previously indicated, whereas arms 29 extend parallel to each other and generally parallel to connector 12. At the ends of arms 29 are provided holes 31 adapted to receive metal snaps 32 (Figure 1) which are secured to the bridle or halter 33 on the horse, and adjacent the bit. In the illustrated example, the snaps 32 are respectively secured to rings 34 to which the bit and strap portions of the bridle are connected.

The bifurcated attaching means 13 thus fits beneath the jaw of the horse, and is provided with suitable padding, not shown, for the purpose of preventing the horse from being injured.

In the operation of the appliance, telescoping tube portions 21 and 22 of connector 12 are adjusted to the desired length, after which cotter pin 26 is inserted through the registered holes 23 and 24. Thereafter, the underportion 16 of the collar is mounted beneath the neck of the horse, and the strap 18 is connected between eyes 17 so as to secure the collar in position. It is then merely necessary to employ the snaps 32 to connect the ends of arms 29 to the bridle 33 adjacent the bit.

The horse is thus restrained from craning his neck downwardly to worry sores on his front legs, yet is relatively comfortable and unimpeded by the appliance. When the horse attempts to crane his head downwardly, his jaw engages the padded base 28 of attaching means 13, and the underportion 16 of collar 10 is pressed against the lower neck of the horse. Because of the construction of the device, such engagement or pressing does not injure the horse in any way.

While the particular device herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A head-restraining device for use on the heads of horses for allowing limited movement of the head while preventing the horse from biting sores on its body or legs, said device comprising an elongated rigid main body having fixed to its opposite ends separate rigid U-shaped members, one of said U-shaped members being shaped to embrace the lower neck portion of the horse in the region of its shoulders and adapted to be supported there by flexible means overlying the horse's neck, the other of U-shaped members being positioned to straddle the lower jaw of the horse's head and to have its ends secured to the horse's halter, bridle or the like headwear, whereby said rigid main body is cooperation with said U-shaped members are effective in preventing flexing of the neck sufficiently to permit biting of the legs and body.

2. A head-restraining device as defined in claim 1 wherein said main body is formed by a pair of telescopically assembled tubular members, and means for locking said tubular members selectively in different positions to fit horses having different neck lengths.

3. A head-restraining device as defined in claim 1 wherein at least one of said U-shaped members is formed of lightweight tubular material having its bight portion welded to one end of said main body.

4. A head-restraining device as defined in claim 3 wherein the ends of said U-shaped members are provided with openings, and flexible strap means having its opposite ends secured to said openings for securing said device to the rear end of a horse's neck.

References Cited in the file of this patent

UNITED STATES PATENTS

| | | |
|---|---|---|
| 230,860 | Brown | Aug. 10, 1880 |
| 406,052 | Massoletti | July 2, 1889 |
| 540,788 | Hammer | June 11, 1895 |
| 752,083 | Lear | Feb. 16, 1904 |
| 1,754,752 | Grim | Apr. 15, 1930 |
| 2,108,566 | Sanders | Feb. 15, 1938 |